US012098233B2

(12) United States Patent
Pollard et al.

(10) Patent No.: US 12,098,233 B2
(45) Date of Patent: *Sep. 24, 2024

(54) DEVOLATILIZER DESIGN (71) Applicant: Dow Global Technologies LLC, Midland, MI (US)

(72) Inventors: Maria Pollard, Pearland, TX (US); Irfan Khan, Houston, TX (US); Shrikant Dhodapkar, Lake Jackson, TX (US); Martin Lopez, Pearland, TX (US); Quan Yuan, Sugar Land, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 916 days.

This patent is subject to a terminal disclaimer.

(21) Appl. No.: 17/059,776

(22) PCT Filed: May 31, 2019

(86) PCT No.: PCT/US2019/034788
§ 371 (c)(1),
(2) Date: Nov. 30, 2020

(87) PCT Pub. No.: WO2019/232290
PCT Pub. Date: Dec. 5, 2019

(65) Prior Publication Data
US 2021/0246235 A1    Aug. 12, 2021

Related U.S. Application Data (60) Provisional application No. 62/678,656, filed on May 31, 2018.

(51) Int. Cl.
*C08F 6/10* (2006.01)
*B01D 1/22* (2006.01)
*B01D 3/06* (2006.01)

(52) U.S. Cl.
CPC ............ *C08F 6/10* (2013.01); *B01D 1/221* (2013.01); *B01D 3/06* (2013.01)

(58) Field of Classification Search
CPC . C08F 6/10; C08F 6/003; B01D 1/221; B01D 3/06; B01D 3/008; C08L 23/04
USPC ........................................................ 528/501
See application file for complete search history.

(56) References Cited

U.S. PATENT DOCUMENTS

| 2,411,186 | A | 11/1946 | Boeckeler |
| 3,014,702 | A | 12/1958 | Oldershaw et al. |
| 2,969,347 | A | 1/1961 | Bellinger et al. |
| 3,366,458 | A | 1/1968 | Jori |
| 3,738,409 | A | 6/1973 | Skidmore |
| 4,153,501 | A | 5/1979 | Fink et al. |
| 4,423,767 | A | 1/1984 | Hay, II et al. |
| 4,431,050 | A | 2/1984 | Martin |
| 4,531,677 | A | 7/1985 | Suzuki et al. |
| 4,564,063 | A | 1/1986 | Tollar |
| 4,616,937 | A | 10/1986 | King |
| 4,753,535 | A | 6/1988 | King |
| 4,808,007 | A | 2/1989 | King |
| 4,808,262 | A | 2/1989 | Aneja et al. |
| 4,925,526 | A | 5/1990 | Havukainen |
| 5,084,134 | A * | 1/1992 | Mattiussi ............... B01D 1/221 159/DIG. 10 |
| 5,453,158 | A * | 9/1995 | Cummings ............ B01D 3/06 159/DIG. 10 |
| 5,977,251 | A | 11/1999 | Kao et al. |
| 6,085,832 | A | 7/2000 | Rehberg |
| 6,420,516 | B1 | 7/2002 | Tau et al. |
| 6,627,040 | B1 | 9/2003 | Elsner et al. |
| 6,764,030 | B2 | 7/2004 | Habib et al. |
| 7,332,058 | B2 | 2/2008 | Reimers |
| 8,518,212 | B2 | 8/2013 | Taylor et al. |
| 8,814,604 | B2 | 8/2014 | Liao et al. |
| 9,345,985 | B2 | 5/2016 | Taylor et al. |
| 11,608,390 | B2 * | 3/2023 | Pollard .................... C08F 2/06 |
| 2002/0182121 | A1 | 12/2002 | Kendrick |
| 2004/0176561 | A1 | 9/2004 | Janeiro |
| 2004/0255780 | A1 | 12/2004 | Konig et al. |
| 2005/0022939 | A1 | 2/2005 | Reimers |

(Continued)

FOREIGN PATENT DOCUMENTS

| CA | 2223816 A1 | 7/1998 |
| CA | 2809718 A1 | 9/2014 |

(Continued)

OTHER PUBLICATIONS

Anonymous in IP.com; "Production of Dual Reactor Polyethylene With Increased Molecular Weight Distributions and/or Increased Short Chain Branching Distributions"; 2017, 2 pages.

International Search Report for International Application No. PCT/US2019/034607; International Filing Date May 30, 2019; Date of Mailing Sep. 17, 2019, 5 pages.

International Search Report for International Application No. PCT/US2019/034609; International Filing Date May 30, 2019; Date of Mailing Aug. 9, 2019, 6 pages.

International Search Report for International Application Serial No. PCT/US2019/034787; International Filing Date May 31, 2019; Report Mail Date Jul. 24, 2019 (6 pages).

(Continued)

Primary Examiner — Terressa Boykin
(74) Attorney, Agent, or Firm — CANTOR COLBURN LLP (57) ABSTRACT A devolatilizer (devo), which operates at a temperature (T) and at a pressure (P), for the separation of at least a portion of a solvent from a polymer-rich solution comprising the solvent and a polymer, and wherein the devolatilizer comprises at least the following components:
A) a distributor, a heater, or a heater/distributor combination;
B) a shroud (component B) located around some or all of the periphery of component A; and
C) a gap (component C) located between the outer surface of component A and the inner surface of component B.

26 Claims, 4 Drawing Sheets

(56) References Cited

U.S. PATENT DOCUMENTS

| | | |
|---|---|---|
| 2005/0061481 A1 | 3/2005 | Kandlikar |
| 2005/0092444 A1 | 5/2005 | Kohlgruber |
| 2006/0272933 A1 | 12/2006 | Domen et al. |
| 2007/0169924 A1 | 7/2007 | Bussonnet |
| 2009/0087355 A1 | 4/2009 | Ashe |
| 2009/0260604 A1 | 10/2009 | Castano Gonzalez et al. |
| 2009/0273112 A1 | 11/2009 | Boothe et al. |
| 2009/0308253 A1 | 12/2009 | Washio |
| 2010/0203006 A1* | 8/2010 | Taylor ............... B01D 1/22 526/71 |
| 2010/0267906 A1 | 10/2010 | Arich De Finetti et al. |
| 2011/0192141 A1 | 8/2011 | Schepers et al. |
| 2012/0116022 A1 | 5/2012 | Lynch et al. |
| 2016/0145390 A1 | 5/2016 | Schmidt et al. |
| 2017/0268401 A1 | 9/2017 | Okami et al. |
| 2018/0258209 A1* | 9/2018 | Dhodapkar ............ C08F 255/02 |
| 2018/0305530 A1* | 10/2018 | Wang ..................... C08J 5/18 |
| 2021/0205729 A1* | 7/2021 | Blanchard ............ F28D 9/0012 |
| 2021/0214470 A1 | 7/2021 | Pollard et al. |
| 2021/0215432 A1 | 7/2021 | Pollard et al. |

FOREIGN PATENT DOCUMENTS

| | | | |
|---|---|---|---|
| CN | 101979116 A | 2/2011 | |
| CN | 202267394 U | 6/2012 | |
| CN | 105925820 A | 9/2016 | |
| CN | 206837535 U | 1/2018 | |
| EP | 0226204 A2 | 6/1987 | |
| EP | 0350217 A2 | 1/1990 | |
| EP | 0413830 A1 | 2/1991 | |
| EP | 0492802 A1 | 7/1992 | |
| EP | 0226204 B1 | 3/1993 | |
| EP | 2072540 A1 | 6/2009 | |
| GB | 982598 A | 2/1965 | |
| GB | 997838 A | 7/1965 | |
| GB | 1135858 A | 12/1968 | |
| GB | 1501816 A | 2/1978 | |
| GB | 2273980 B | 1/1997 | |
| JP | H01172401 A | 7/1989 | |
| JP | 2007303693 A | 11/2007 | |
| WO | 9524252 A1 | 9/1995 | |
| WO | 9736942 | 10/1997 | |
| WO | 9932524 A1 | 7/1999 | |
| WO | 0017244 A1 | 3/2000 | |
| WO | 0121303 A1 | 3/2001 | |
| WO | 0191877 A2 | 12/2001 | |
| WO | 0234795 A1 | 5/2002 | |
| WO | 2004000891 A1 | 12/2003 | |
| WO | 2006120177 A2 | 11/2006 | |
| WO | 2009126277 A2 | 10/2009 | |
| WO | 2011008955 A1 | 1/2011 | |
| WO | 2011100129 A1 | 8/2011 | |
| WO | 2014018892 A1 | 1/2014 | |
| WO | 2014035664 A1 | 3/2014 | |
| WO | 2014179045 A1 | 11/2014 | |
| WO | WO-2017053517 A1 * | 3/2017 | ............... C08F 2/01 |
| WO | 2019232183 A1 | 12/2019 | |
| WO | 2019232185 A1 | 12/2019 | |
| WO | 2019232289 A1 | 12/2019 | |

OTHER PUBLICATIONS

International Search Report for International Application Serial No. PCT/US2019/034788; International Filing Date May 31, 2019; Report Mail Date Jul. 24, 2019 (6 pages).

Joshi, et al., "The Kenics static mixer: new data and proposed correlations", The Chemical Engineering Journal 59 (1995) pp. 265-271, The Chemical Engineering Journal, Elsevier.

Oh et al.; "High Performance Metallocene Polyethylene Based on SK Innovation's Nexlene Technology"; Annual Technical Conference of the Society of Plastics Engineers; 70th, vol. 3; Jan. 2012, 5 pages.

Pilch et al.; "Use of Breakup Time Data and Velocity History Data to Predict the Maximum Size of Stable Fragments for Acceleration-Induced Breakup of a Liquid Drop"; Int. J. Multiphase Flow; vol. 13, No. 6; Jan. 1987, pp. 741-757.

Written Opinion for International Application No. PCT/US2019/034607; International Filing Date May 30, 2019; Date of Mailing Sep. 17, 2019, 8 pages.

Written Opinion for International Application No. PCT/US2019/034609; International Filing Date May 30, 2019; Date of Mailing Aug. 9, 2019, 9 pages.

Written Opinion for International Application Serial No. PCT/US2019/034787; International Filing Date May 31, 2019; Report Mail Date Jul. 24, 2019 (11 pages).

Written Opinion for International Application Serial No. PCT/US2019/034788; International Filing Date May 31, 2019; Report Mail Date Jul. 24, 2019 (9 pages).

Surana et al.; "New technique to measure high-pressure and high-temperature polymer-solvent vapor-liquid equilibrium"; Materials Science, Chemistry; Fluid Phase Equilibria; vol. 139, Issues1-2; Dec. 1997, pp. 361-370 (abstract only).

* cited by examiner

Comparative example | Inventive example-1 | Inventive example-2 | Inventive example-3 | Inventive example-4

DEVOLATILIZER DESIGN

CROSS REFERENCE TO RELATED APPLICATIONS

This application is a National Stage application of PCT/US2019/034788, filed May 31, 2019, which claims the benefit of U.S. Provisional Application No. 62/678,656, filed May 31, 2018, both of which are incorporated by reference in their entirety herein.

BACKGROUND

For solution polymerization, there is a need for a devolatilization design that will reduce polymer carryover into the vacuum condensers. In a solution polyethylene process, the unreacted ethylene and the solvent is typically removed from the polymer using two flash units, referred to as the devolatilization (devo) tanks. The unreacted ethylene and most of the solvent are removed in the first devo, resulting in a polymer concentration of 80-90 wt %. The rest of the solvent is removed in the second devo. The stream from the first devo is typically heated using a heat exchanger or heater. As the polymer flows through the heater and it heats up, the solvent vaporizes and it phase-separates out of the polymer causing foam formation towards the exit of the heater slots into the second devo tank. The volatiles disengage from the polymer outside the heater, the molten polymer collects at the bottom of the vessel and the vapors are removed through nozzles at the top of the devo tank. However, typical devo designs experience high polymer carryover into the vents and eventually into the vacuum condensers. When polymer gets carried over into the vacuum condensers, it fouls the condensers reducing their effectiveness, i.e., the vacuum condensers cannot maintain the level of vacuum inside the devo. Some devo and/or heater designs are described in the following references: U.S. Pat. Nos. 4,808,262, 5,084,134, 5,453,158, 6,627,040, 7,332,058 and 8,518,212. However, there remains a need for a devolatilization design that will reduce polymer carryover into the vacuum condensers. This need has been met by the following invention.

SUMMARY OF INVENTION

A devolatilizer (devo), which operates at a temperature (T) and at a pressure (P), for the separation of at least a portion of a solvent from a polymer-rich solution comprising the solvent and a polymer, and wherein the devolatilizer comprises at least the following components:
  A) a distributor, a heater, or a heater/distributor combination (component A) of length L, the vertical distance from the top to the bottom of the component A;
  B) a shroud (component B) located around some or all of the periphery of component A; and wherein the shroud comprises at least one cylindrical section situated outside the periphery of component A, and wherein this cylindrical section encloses at least a portion of the periphery of component A, and
  C) a gap (component C) located between the outer surface of component A and the inner surface of component B, and wherein the gap has a width (w), the distance from the outer surface of component A to the inner surface of the at least one cylindrical section of component B, and the gap has a length ≤L; and wherein w may optionally vary continuously or discontinuously along the length L; and wherein component A comprises an inner channel, and a plurality of cross-sectional openings extending from the inner channel to the gap; and wherein some or all of the polymer rich solution enters the inner channel, and moves radially through the cross-sectional openings, and within each opening, some or all of the solvent of the polymer rich solution is vaporized, forming a solvent vapor and a polymer melt; and wherein the polymer melt enters the gap, and flows downward from the point of entrance into the gap, and wherein some or all of the solvent vapor flows downward from the point of entrance into the gap; and wherein for each vertical distance, y, as measured from the top of the outer surface of component A, the total amount of the solvent vapor that leaves component A at the given distance y, and flows downward into component C, has the following velocities:
  a) within the gap, an average vertical downward velocity, defined as the ratio of "the total solvent vapor flow rate" to "the cross-sectional area available for flow," and wherein each of "the total solvent vapor flow rate" and "the cross sectional area available for flow" is measured at the same vertical distance, y, and
  b) a radial average velocity exiting the component A, defined as the ratio of "the total solvent vapor flow rate at the exit of component A, at the temperature (T) and pressure (P) of the devolatilizer" to "the number of openings in component A multiplied by the cross-sectional area of each opening;" and
wherein the average vertical downward velocity≤the radial average velocity exiting the component A.

BRIEF DESCRIPTION OF THE DRAWINGS

FIG. 7 vapor in the gap between components A and B, versus y values," for each devo design shown in FIG. 4. FIG. 7 contains a constant line for the radial average velocity exiting the component A. Note, the velocity (V (m/s)) results for Inventive Example 2 and Inventive Example 3 coincide—see the lowest profile on FIG. 7. The average radial velocity of the vapor is also depicted as a horizontal line. is a plot of the "average vapor vertical downward velocity" of the FIG. 8 depicts an outer vessel enclosing a distributor and/or heater (component A) and a shroud (component B).

DETAILED DESCRIPTION OF THE INVENTION

As discussed above an apparatus is a devolatilizer (devo), as discussed above (see Summary of Invention), is provided.

The devolatilizer (devo) may comprise two or more embodiments described herein.

In one embodiment, the polymer-rich solution comprises ≥60 wt %, or ≥70 wt %, or ≥80 wt %, or ≥90 wt %, or ≥95 wt % of the polymer, based on the weight of the polymer-rich solution.

In one embodiment, the width (w) of the gap varies along the length L.

In one embodiment, the width (w) of the gap varies continuously along the length L.

In one embodiment, the width (w) of the gap varies discontinuously along the length L.

In one embodiment, L is from 10 cm to 200 cm, or from 20 cm to 180 cm, or from 30 cm to 160 cm.

In one embodiment, for each distance y, the average vertical downward velocity from 1 m/s to 10 m/s, or from 1 m/s to 8 m/s, or from 1 m/s to 6 m/s, or from 1 m/s to 4 m/s.

In one embodiment, the radial average velocity exiting the component A is ≥10 m/s or ≥8 m/s, or ≥6 m/s.

In one embodiment, component A has a symmetrical cross-sectional area along the length of component A.

In one embodiment, component A is cylindrical in shape, and further A is a cylinder.

In one embodiment, for component A, the cross-sectional openings all have the same dimensions. As used herein, the phrase "same dimensions" refers to a tolerance of ±1.0% of a target dimension.

In one embodiment, the cylindrical section of component B has a length which is greater than or equal to the length of component A. In a further embodiment, the cylindrical section of component B has a length which is equal to the length of component A.

In one embodiment, the cylindrical section of component B has a length which is less than the length of component A.

Figure 6:
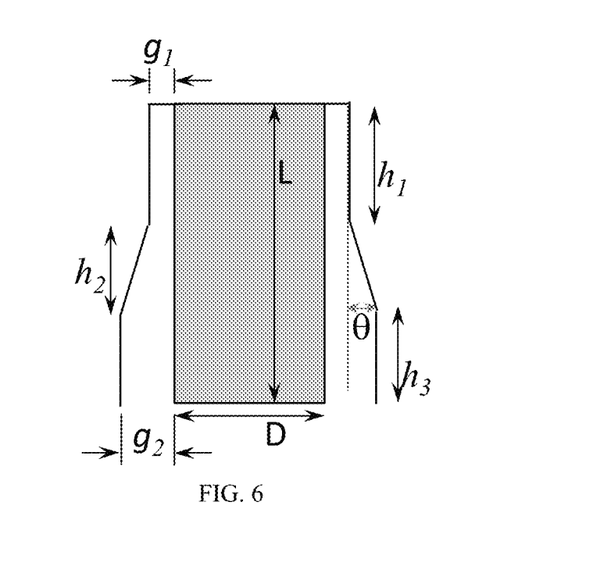
FIG. 6 depicts one embodiment/variation of inventive design-1.

In one embodiment, for component B, the cylindrical section comprises a continuous flared cylinder, which has a lower outer diameter, at the end of the flared cylinder, which is greater than an upper outer diameter, at the beginning of the flared cylinder. See, for example, Inventive Example 1 of FIG. 4, and FIG. 6. In a further embodiment, the lower outer diameter is >1.2× the upper outer diameter. The bottom of the flared cylinder is downstream from the top of the flared cylinder.

In one embodiment, for component B, the cylindrical section comprises a vertical section of length $h_1$, followed by a flared section of length $h_2$. In a further embodiment, the flared section of length $h_2$ is followed by a vertical section of length $h_3$. See, for example, FIG. 6. In one embodiment $h_1=h_2$. In one embodiment, $h_1=h_2=h_3$. In one embodiment, $h_2 \geq h_1$ and/or $h_2 \geq h_3$. In one embodiment, $h_1+h_2 \leq L$, or $h_1+h_2 \geq L$, or $h_1+h_2=L$. In one embodiment, $h_1+h_2+h_3 \leq L$, or $h_1+h_2+h_3 \geq L$.

In one embodiment, the shroud of component B comprises ≥2 separate sections, and each section is located at a distance $d_1$ from the center of component A. In a further embodiment, the shroud of component B comprises ≥4 separate sections, and each section is located at a distance $d_1$ from the center of component A. As used herein, the phrase "center of component A" refers a center point (for symmetrical area) or geometric center (for asymmetrical area) in the cross-sectional area of component A. See, for example, Inventive Example 2 of FIG. 4.

In one embodiment, $d_1$ is ≥50 cm, or ≥55 cm, or ≥60 cm, or ≥65 cm, or ≥ 70 cm, or ≥75 cm, or ≥80 cm. In one embodiment, $d_1$ is ≤ 300 cm, or ≤ 280 cm, or ≤ 260 cm, or ≤ 240 cm, or ≤ 220 cm, or ≤ 200 cm, or ≤ 180 cm, or ≤ 160 cm.

In one embodiment, the shroud of component B comprises 8 separate sections, and wherein 4 of the sections are located at a distance $d_1$ from the center of component A, and 4 of the sections are located at a distance $d_2$ from the center of component A; and wherein $d_2>d_1$. In a further embodiment, $d_2 \geq 1.2 \times d_1$. See, for example, Inventive Example 3 of FIG. 4.

In one embodiment, $d_1$ is ≥50 cm, or ≥55 cm, or ≥60 cm, or ≥65 cm, or ≥70 cm, or ≥75 cm, or ≥80 cm. In one embodiment, $d_1$ is ≤ 300 cm, or ≤ 280 cm, or ≤ 260 cm, or ≤ 240 cm, or ≤ 220 cm, or ≤ 200 cm, or ≤ 180 cm, or ≤ 160 cm.

In one embodiment, $d_2$ is ≥70 cm, or ≥75 cm, or ≥80 cm, or ≥85 cm, or ≥ 90 cm, or ≥95 cm, or ≥100 cm. In one embodiment, $d_2$ is ≤ 400 cm, or ≤ 380 cm, or ≤ 360 cm, or ≤ 340 cm, or ≤ 320 cm, or ≤ 300 cm, or ≤ 280 cm, or ≤ 260 cm, or ≤ 240 cm, or ≤ 220 cm, or ≤ 200 cm.

In one embodiment, the cylindrical section of component B comprises an upper continuous radial section of length $L_C$, and a lower segmented section comprising ≥2 separate segments, each of length $L_S$; and wherein $L_S>L_C$; and wherein $L_C$ is measured from the top of the shroud to the end of the upper continuous radial section; and wherein $L_S$ is measured from the top of the shroud to the end of a lower segmented section. In a further embodiment, the lower segmented section comprising ≥4 separate segments, each of length $L_S$; and wherein $L_S>L_C$. In a further embodiment, $L_S>1.2\times L_C$. See, for example, Inventive Example 4 of FIG. 4.

In one embodiment, $L_S$ is ≥50 cm, or ≥55 cm, or ≥60 cm, or ≥65 cm, or ≥70 cm, or ≥75 cm, or ≥80 cm. In one embodiment, $L_S$ is ≤ 300 cm, or ≤ 280 cm, or ≤ 260 cm, or ≤ 240 cm, or ≤ 220 cm, or ≤ 200 cm, or ≤ 180 cm, or ≤ 160 cm.

In one embodiment, $L_C$ is ≥70 cm, or ≥75 cm, or ≥80 cm, or ≥85 cm, or ≥90 cm, or ≥95 cm, or ≥100 cm. In one embodiment, $L_C$ is ≤ 400 cm, or ≤ 380 cm, or ≤ 360 cm, or ≤ 340 cm, or ≤ 320 cm, or ≤ 300 cm, or ≤ 280 cm, or ≤ 260 cm, or ≤ 240 cm, or ≤ 220 cm, or ≤ 200 cm.

In one embodiment, the shroud of component B has a design, such that the maximum average downward velocity of the solvent vapor at location y, in the gap of component C, meets the following equations 5A to 5C:

$$V_{vd} \geq \frac{qDy}{\left(g_1 + \frac{D}{2}\right)^2 - \left(\frac{D}{2}\right)^2}, \text{ if } y \leq h_1, \quad \text{EQN. 5A}$$

$$V_{vd} \geq \frac{qDy}{\left(g_1 + (y-h_1)\tan\theta + \frac{D}{2}\right)^2 - \left(\frac{D}{2}\right)^2}, \text{ if } h_2 \geq y > h_1, \quad \text{EQN. 5B}$$

where D is the diameter of component A,
y is the vertical distance from the top of component A to the point along component A where the width of the gap is measured,
q is the volumetric flow rate of the evaporated solvent per unit area per unit time,
$g_1$ is the initial gap distance for a certain length $h_1$, and $g_2$ is the gap distance at a certain length $h_2$.

At length $h_1$, as measured from the top of the heater or distributor, there begins a conical section, with an angle θ from the vertical axis, as defined by the initial gap $g_1$ and the length $h_1$ at the top part of the shroud. See, for example, Inventive example 1 in FIG. 4 as depicted by Design-1 in FIG. 5 and FIG. 6. At length $h_2$, as measured from the bottom of length $h_1$, there begins a cylindrical section as defined by the constant gap distance g, evaluated at length $h_2$, and that has a length $h_3$ as measured from the bottom of length $h_2$.

In one embodiment, $h_1$ is from greater than 0 to 200 inches, or from 2 to 100 inches, or from 4 to 80 inches, or from 6 to 60 inches.

In one embodiment, θ is from 5 to 25 degrees, or from 10 to 15 degrees.

In one embodiment, $V_{vd}$ is from 1 to 30 m/s, or from 2 to 15 m/s.

In one embodiment, $h_2$ is from greater than 0 to 300 inches, or from 2 to 250 inches, or from 4 to 220 inches, or from 6 to 200 inches.

In one embodiment, $h_3$ is from greater than 0 to 100 inches, or from 2 to 80 inches, or from 4 to 60 inches, or from 6 to 40 inches.

In one embodiment, the shroud of component B has a design, such that the maximum average downward velocity of the solvent vapor at location y, in the gap of component C, meets the following equations 6A, 6B and 6C:
where D is the diameter of component A, $$\text{if } y \leq \alpha \quad V_{vd} \geq \frac{qDy}{\left(g_3+\frac{D}{2}\right)^2 - \left(\frac{D}{2}\right)^2}, \quad \text{EQN. 6A}$$

$$\text{if } \alpha < y < L - \beta \quad V_{vd} \geq \frac{qDy}{\frac{n\lambda}{2}(D+2g_3)(y-\alpha) + \left(g_3+\frac{D}{2}\right)^2 - \left(\frac{D}{2}\right)^2}, \quad \text{EQN. 6B}$$

$$\text{if } L - \beta \leq y \leq L \quad V_{vd} \geq \frac{qDy}{\frac{n\lambda}{2}(D+2g_3)(y-\alpha-\beta) + \left(g_3+\frac{D}{2}\right)^2 - \left(\frac{D}{2}\right)^2}, \quad \text{EQN. 6C}$$

y is the vertical distance from the top of component A to the point along component A where the width of the gap is measured, q is the volumetric flow rate of the evaporated solvent per unit area per unit time, $g_3$ is the gap distance for a certain length y.

n is the number of openings or slits around the surface of the shroud creating a partial or segmented shroud: each opening can begin at a length a as measured from the top of the shroud, and end at a distance β as measured from the bottom of the shroud. The segment of each opening, is such that it forms an angle λ, when observed from the cross view at the top of the design. See, for example, Inventive examples 2 and 4 in FIG. 4 (variations of Design-2 in FIG. 5).

In one embodiment, $g_3$ is from 2 to 40 inches, or from 6 to 30 inches, or from 12 to 20 inches.

In one embodiment, λ is from 10 to 45 degrees, or from 12 to 35 degrees or from 15 to 30 degrees.

In one embodiment, a and Beach, independently, range from greater than 0 to 60 inches, or from 1 to 50 inches, or from 3 to 40 inches.

In one embodiment, the devolatilizer operates at a temperature (T) from 100° ° C. to 300° C., or from 120° ° C. to 280° C., from 140° ° C. to 260° C., from 160° ° C. to 240° C., from 180° C. to 220° C., as measured with thermocouples imbedded in thermowells, and at a pressure (P) from 5 mBar to 100 mBar, or from 10 mBar to 80 mBar, or from 15 mBar to 60 mBar, as measured with pressure transducers imbedded into the vessel.

In one embodiment, the devolatilizer operates at a temperature (T) from 100° ° C. to 300° C., or from 120° ° C. to 280° C., from 140° ° C. to 260° C., from 160° C. to 240° C., from 180° C. to 220° C., and at a pressure (P) from 5 mBar to 50 mBar, or from 10 mBar to 40 mBar, or from 15 mBar to 30 mBar.

In one embodiment, the devolatilizer further comprises an outer vessel, and wherein there is a gap ($g_5$) located between the outer surface of the cylindrical section of component B and the inner surface of the outer vessel. In a further embodiment, the width of $g_5$ varies continuously or discontinuously along the length of the cylindrical section of component B.

In one embodiment, the ratio of "the minimum width of $g_5$" to "the maximum width of the gap of component C" is ≥0.5, or ≥1.0, or ≥1.5, or ≥2.0, or ≥2.5, or ≥3.0.

In one embodiment, the diameter of the outer vessel, $D_{tank}$, is from 1 m to 10 m, or from 2 m to 10 m. In one embodiment, the top of the shroud of component B is welded to the wall of the outer vessel.

Also provided, is a reactor system comprising at least one reactor and the devolatilizer of one or more embodiments described herein. In a further embodiment, the reactor is a loop reactor.

Also provided, is a solution polymerization process to form a polymer, said process comprising at least the following steps:

i) reacting a mixture comprising a solvent, monomer, and optionally one or more comonomers, in at least one reactor, to form a polymer solution comprising the solvent and the polymer;

ii) separating at least a portion of the solvent from the polymer solution to form a polymer-rich solution comprising the polymer and solvent, and wherein the polymer-rich solution comprises more polymer than the polymer solution;

iii) separating at least a portion of the solvent from the polymer-rich solution using the devolatilizer of one or more embodiments described herein.

In one embodiment, the polymer-rich solution comprises ≥60 wt %, or ≥70 wt %, or ≥80 wt %, or ≥90 wt %, or ≥95 wt % of the polymer, based on the weight of the polymer-rich solution.

In one embodiment, the polymer is an olefin-based polymer, and further an ethylene-based polymer.

In one embodiment, the reactor is a single loop reactor or a dual loop reactor. Suitable reactors are disclosed in International Publication Number WO 97/36942, entitled "Olefin Solution Polymerization."

A devolatilizer, as described herein, may also be used in the isolation of a polymer product formed in a high pressure (≥1000 bar), free-radical polymerization. For example, a polymerization process to form a low density polyethylene (LDPE). Such a devolatilizer is well suited as a separator for the removal of ethylene, minor solvent components and/or additives (for example, peroxide derivatives and catalyst derivatives) from a LDPE or other polymer product.

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, 50 wt % or a majority amount of an olefin monomer, for example ethylene or propylene (based on the weight of the polymer), and optionally may comprise at least one polymerized comonomer.

The term, "ethylene-based polymer," as used herein, refers to a polymer that comprises 50 wt % or a majority amount of polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, 50 wt % or a majority amount of ethylene monomer (based on the weight of the interpolymer), and at least one α-olefin.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term "propylene-based polymer," as used herein, refers to a polymer that comprises, in polymerized form, a majority amount of propylene monomer (based on the total weight of the polymer) and optionally may comprise at least one polymerized comonomer.

The terms "devolatilizer," or "devo," or "devolatilization tank," as used herein, refer to a vessel, typically cylindrical in shape at the top, and with a conical section at the bottom; and which can operate at above atmospheric pressure or under a vacuum; and which typically has at least one inlet for the polymeric solution, and one or more outlet(s) for vapor to exit, typically located at the top, and an outlet for polymer melt at the bottom. The purpose of a devolatilizer (devo) vessel is to remove solvent from a polymerization product. A process can have multiple devolatilizer (devo) vessels operating at different conditions, in order to remove residual solvent from the polymer product.

The term "solvent," as used herein, refers to an organic compound or a mixture of two or more organic compounds. A typical solvent includes ISOPAR® E (from ExxonMobil), which is produced from petroleum-based raw materials that are treated with hydrogen in the presence of a catalyst to produce a low odor, low aromatic hydrocarbon solvent. The major components include alkanes, isoalkanes, and cycloalkanes. Here, the solvent dissolves the polymer and reaction components of interest.

The term "polymer solution," as used herein, refers to a single-phase solution of a polymer dissolved in a solvent, such as ISOPAR® E. A polymer solution typically contains from 20 to 95% by weight polymer.

The term "solution polymerization," as used herein, refers to polymerization process, in which the polymer product is dissolved in the solvent of the polymerization process.

The term "distributor," as used herein, refers to an apparatus designed to distribute a polymeric solution, so as to increase the area of the polymer solution for mass transfer and removal and disengagement of the polymer melt from the vapor solvent compounds.

The term "heater," as used herein, refers to an apparatus that is designed to heat a polymeric solution, typical from, for example, 180° C. to 250° C.

The term "heater/distributor combination," as used herein, refers to an apparatus comprising both a heater, as described herein, and a distributor, as described herein. Examples of suitable heaters are described in U.S. Pat. Nos. 5,453,158 and 8,518,212.

The term "shroud," as used herein, refers to a metal piece of various designs that surrounds a distributor, a heater, or a heater/distributor combination, leaving a gap between the outer surface of the distributor, the heater, or the heater/distributor combination, and its inner surface. Component B: the shroud—is used to help prevent the splashing of solvent and/or polymer into the or onto the inner surface of a vessel which contains component A and component B.

The phrase "continuous cylindrical section," as used herein in references to component B (shroud), refers to a piece of metal, typically cylindrical in form, that surrounds at least a portion of component A (the distributor, the heater, or the heater/distributor combination).

Segmented sections of component B are pieces of metal that surround component A, and are placed, in such a way, that they partially surround component A, with spaces open for vapor and polymer to escape the region between the outer surface of component A and the inner surface of the component B.

The term "plurality," as used herein, in reference to openings or other features, refers to two or more openings or other features.

The term "gap," as used herein, refers to the region defined by the outer surface of component A (the distributor, the heater, or the heater/distributor combination) and the inner surface of the component B (shroud).

The phrase "outer surface of component A," and similar phrases, as used herein, refer to the outer most surface of component A.

The phrase "inner surface of component B," and similar phrases, as used herein, refer to the inner most surface of component B.

The phrase "diameter of component A," and similar phrases, as used herein, refer to the outer diameter of component A.

The phrase "length of component A," and similar phrases, as used herein, refer to the longest vertical section of component A.

The phrase "diameter of component B," and similar phrases, as used herein, refers to the outer most diameter of component B.

The phrase "length of component B," and similar phrases, as used herein, refers to the longest section of component B.

Polymer-rich solution: a polymer solution, typically an ethylene-based polymer in a hydrocarbon solvent, such that the polymer concentration is greater than 50% by weight in that solution.

Solvent vapor: typically compounds found in the solvent, such as, for example, alkanes, that are vaporized under the process conditions.

The phrase "the total solvent vapor flow rate," in regard to the determination of the average vertical downward velocity, can be calculated from the polymer production rate and the percentage of solvent present at the inlet of the devo.

The phrase "the cross-sectional area available for flow," in regard to the determination of the average vertical downward velocity, can be calculated from the geometries of the gap formed by the outer surface of component A and the inner surface of component B along the length, L, as measured from the top of component B.

The length (L) of the at least one cylindrical section, situated outside the periphery of component A, refers to the longest distance from the top to the bottom of this cylindrical section. Here, the bottom of the cylindrical section is downstream from the top of the cylindrical section.

The phrase "length of a weld line," and similar phrases, as used herein, refer to the shorter dimension (typically a vertical dimension) of the weld line. The length of the weld line can be from 1 mm to 50 mm, or from 2 mm to 20 mm.

The term "reactor system," as used herein, refers to the one or more apparatus used to polymerize a polymer, and the one or more apparatus used to isolate a polymer product.

The term "comprising," and derivatives thereof, is not intended to exclude the presence of any additional component, step or procedure, whether or not the same is disclosed herein. In order to avoid any doubt, all compositions claimed, herein, through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Index

Melt indices $I_2$ (or I2) and $I_{10}$ (or I10), for ethylene-based polymers, are measured in accordance with ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Conventional Gel Permeation Chromatography (Conv. GPC)

A GPC-IR high temperature chromatographic system from PolymerChar (Valencia, Spain), was equipped with a Precision Detectors (Amherst, MA), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, CA).

Injection temperature was controlled at 150 degrees Celsius. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was "200 microliters,' and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci., Polym. Letters*, 6, 621 (1968)):

$$M_{polyethylene} = A \times (M_{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} = (IR_{measurement\ channel_i} / M_{PE_i})}, \quad \text{(Eqn. 2)}$$

$$Mw(conv\ gpc) = \frac{\sum_{i=RV_{integration\ start}}^{i=RV_{integration\ end}} (M_{PE_i} IR_{measurement\ channel_i})}{\sum_{i=RV_{integration\ start}}^{i=RV_{integration\ end}} (IR_{measurement\ channel_i})}, \quad \text{(Eqn. 3)}$$

$$Mz(conv\ gpc) = \frac{\sum_{i=RV_{integration\ start}}^{i=RV_{integration\ end}} (M_{PE_i}^2 IR_{measurement\ channel_i})}{\sum_{i=RV_{integration\ start}}^{i=RV_{integration\ end}} (M_{PEi} IR_{measurement\ channel_i})}. \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation were performed using "GPC One software (version 2.013H)" from PolymerChar.

Experimental

Figure 1:
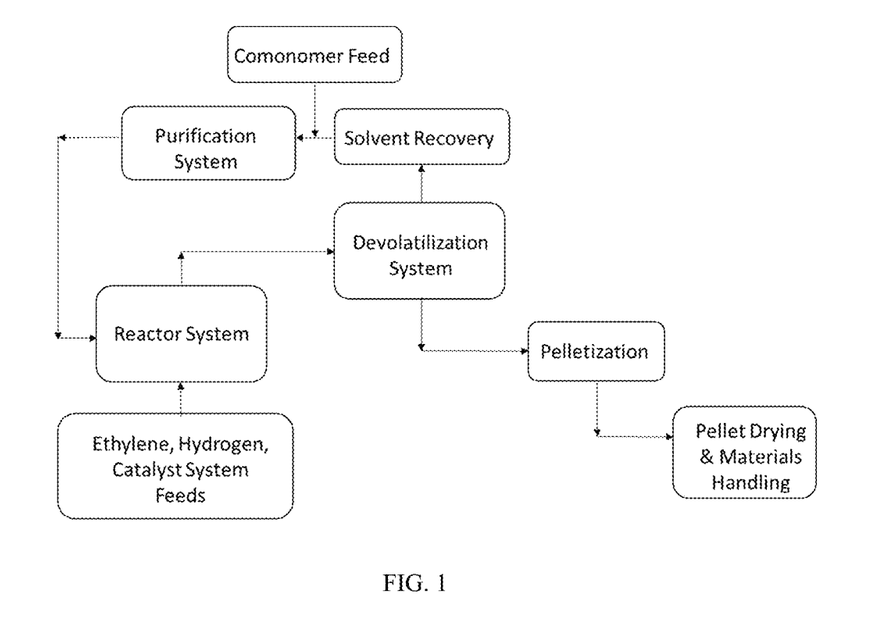
FIG. 1 is a schematic of a solution polymerization process.

FIG. 1 describes an overall solution polymerization process for polymerizing one or more alpha-olefin monomers, in a sufficient amount of solvent, to produce an olefin-based polymer. Basic polymerization and isolation apparatuses include feed lines (for example, ethylene feed, hydrogen feed, catalyst system feed(s), a comonomer feed (for example, an alkene, such as butene, hexene or octene), a reactor system, a devolatilizer system, a solvent recovery system, a purification system, a pelletization system, and a system for pellet drying and material handling.

Typically, the polymer solution, exiting the reactor system, has a polymer content from 3 to 40 percent by weight, preferably 10 to 30 percent by weight, based on the weight of the solution. Such polymerizations can be used to produce polymers, for example, substantially linear polymers, having an average molecular weight from 2,000 to 1,000,000 g/mole. The reacting system can comprise adiabatic reactors, isothermal reactors, or combinations thereof. The reactor temperatures can range from 100 to 300° C., further from 100 to 250° C., and preferably from 150 to 220° C., and the pressures can range from 350 to 3,000 psi, preferably from 700 to 1,000 psi. The polymeric solution is concentrated by means of adiabatic flashes, with intermediate heating of the solution, to result in a polymer melt with sufficiently low residual solvent to allow for pelletization, drying and packaging of the pellets. The solvent is recovered, purified, and recycled back to the reactor system, where it is injected with fresh monomers.

This process can be used for making olefin-based polymers, such as ethylene homopolymers, or interpolymers with other alkenes (for example, copolymers or terpolymers), and, optionally, a diene (for example an EPDM terpolymer). Catalysts used can be Ziegler-Natta, bis-metallocene, constrained geometry, or a polyvalent aryloxyether complex. A variety of commercial solvents could be used, such as ISOPAR® E from ExxonMobil. In practice, the solvent exiting the reactor system comprises unreacted monomers as well as isomers of those monomers and various impurities.

Figure 2:
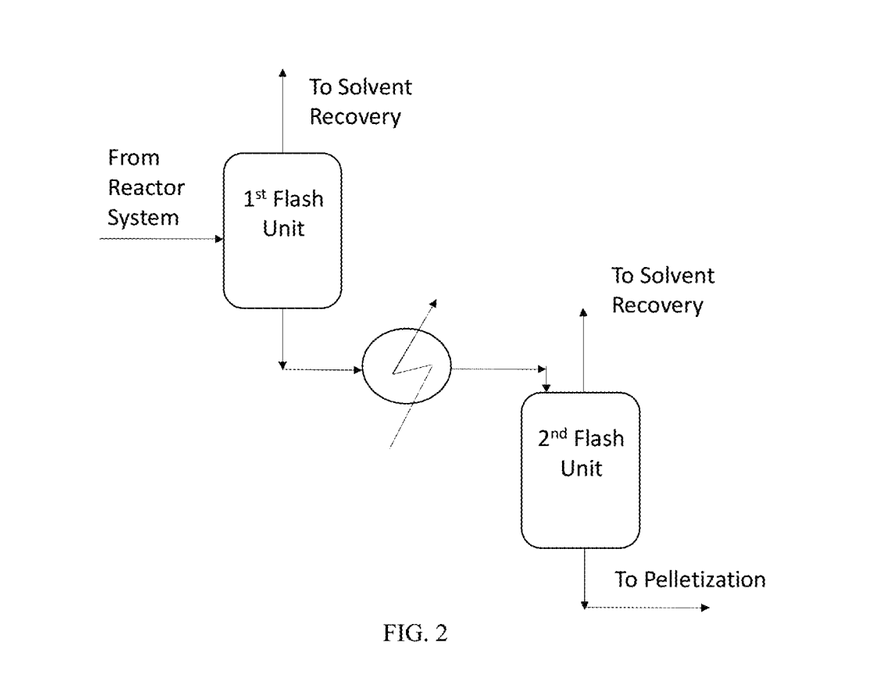
FIG. 2 is a schematic of a devolatilization process.

A schematic of a suitable devolatilization process is presented in FIG. 2. The polymer solution exiting the reactor system enters a first flash unit, and is subject to a devolatization step. In the first flash unit, the polymer concentration is increased to 40 to 90 wt %, preferably to 60 to 85 wt %, based on the weight of the concentrated polymer solution. The liquid stream from the first flash unit can be heated up to 300° C., preferably up to 260° C., and it is flashed under vacuum to remove more solvent, to less than 3,000 ppm by weight, preferably less than 500 ppm by weight. The heater can be situated outside the second flash unit, and a distributor can be situated inside the second flash unit, or the heater can be situated inside the second flash unit, and thus the heater operates as both a heater of the concentrated polymer solution and a distributor for the resulting polymer melt.

Figure 3:
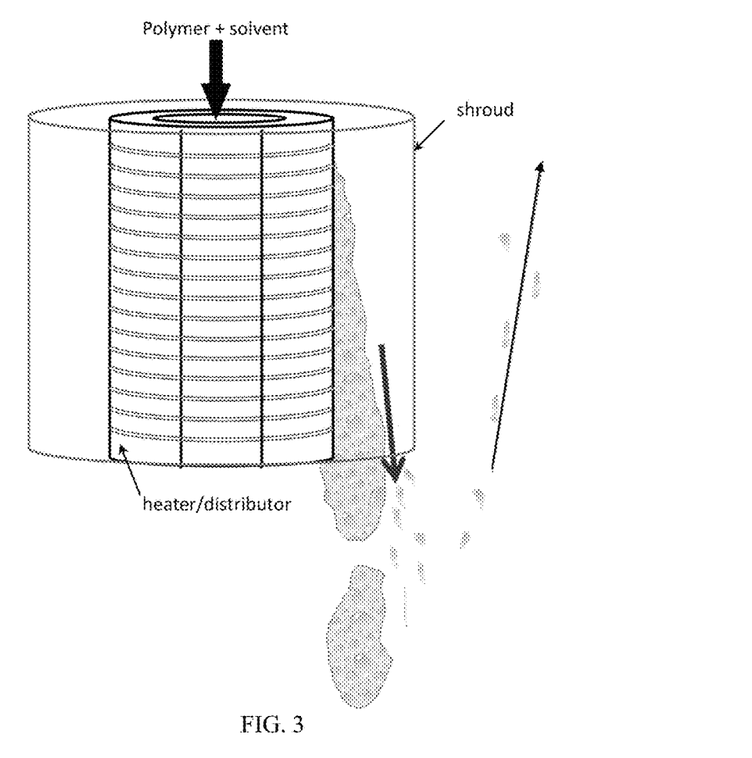
FIG. 3 is a schematic of the polymer and vapor exiting the "heater and/or distributor" and moving through the annular region between the heater/distributor and the shroud.
Figure 4:
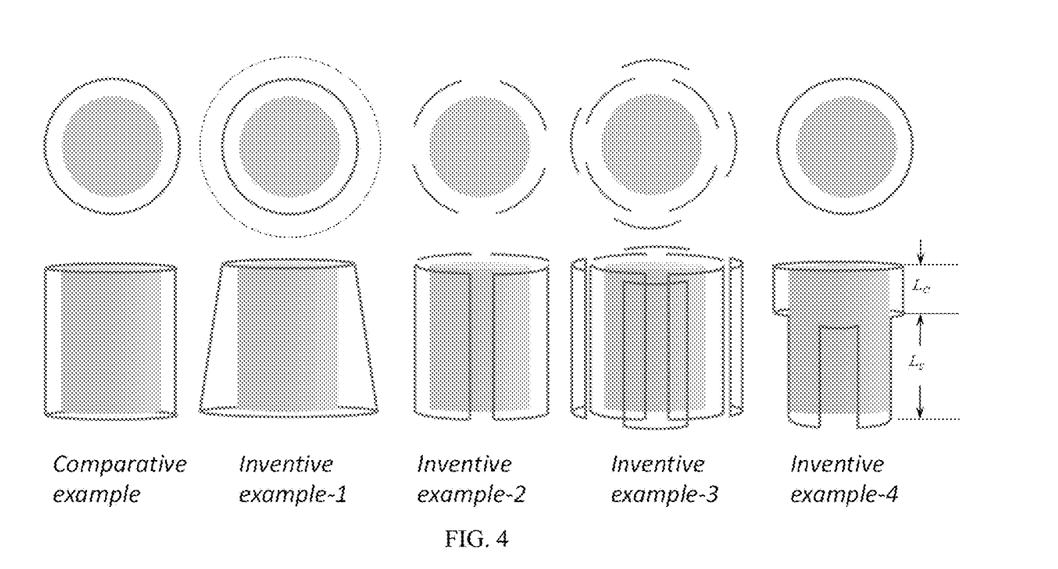
FIG. 4 is a schematic of the different shroud designs, including the comparative example.

FIG. 3 and FIG. 4 are schematics of flash units, each containing a heater and/or distributor. The flash unit is a vessel, and it can be cylindrical in shape at the top with a converging conical section at the bottom. The diameter of the cylindrical section can be two to six times the diameter of the heater and/or distributor. The length of the cylindrical section can be one to two times the length of the heater and/or distributor. The conical section can be two to five times the length of the cylindrical portion of the vessel and it ends at an opening of a gear pump or extruder. The vessel can operate at above atmospheric pressure or under vacuum. There is an inlet for the polymeric solution, and one or multiple outlets for vapor to exit, typically located at the top, and an outlet for the polymer melt at the bottom. The purpose of the vessel is to remove solvent from the polymerization product. A process can have multiple flash vessels operating at different conditions in order to remove residual solvent from the polymer product gradually. Examples of suitable heaters are described in U.S. Pat. Nos. 5,453,158 and 8,518,212.

There can be a cylindrical shroud surrounding the heater and/or distributor, in order to prevent polymer from splashing onto the walls of the flash unit (not shown). The concentrated polymer (polymer-rich) solution flows into a hollow core inside the "heater and/or distributor," and exits by moving radially outwards through a multiplicity of slots, extending horizontally, from the core to the outer wall of the "heater and/or distributor." As the polymer solution moves radially through the slots of the heater or distributor, solvent can be vaporized, when the pressure becomes low enough to reach the bubble point of the polymer solution, creating two-phase flow: The vapor solvent separates from the polymer, as the two-phase solution exits the heater or distributor slots. The vapor exits the flash vessel through the vents or outlets, which are typically located at the top of the flash vessel. As the solvent evaporates, it is creating a mostly molten polymer stream, which flows down the outside wall of the "heater and/or distributor," and falls down into a polymer melt pool, and is discharged to a pelletization or further isolation unit. Both the solvent vapor and the molten polymer exit the heater and/or distributor slots with velocities in the radial direction first. As both the solvent vapor and the molten polymer exit the heater or distributor slots, they are forced to flow downwards into the annular region that is created between the heater and/or distributor and the shroud. The total mass flow rate of vapor and polymer keeps increasing, going downward along the outer wall of the heater and/or distributor, as more polymer and vapor exit the slots of the heater and/or distributor. As more material flows downwards, both the vapor and polymer velocities increase, resulting in high vapor velocities at the bottom of the gap between the heater and/or distributor and the shroud. High vapor velocities can cause the molten polymer to break up into small droplets, which then can be carried with the vapor stream that exits at the top of the flash vessel, rather than flowing down into the bottom of the flash unit. FIG. 3 depicts such a possible situation. Polymer droplets exiting the flash unit can get carried with the vapor stream, causing fouling in the units downstream of the flash unit. This polymer carryover can be reduced, if the downward vertical vapor velocities, in the annular region between the outer surface of "heater and/or distributor" and the inner surface shroud, are reduced.

As the downward vertical vapor velocity increases in the annular space between the heater and/or distributor and the shroud, the average polymer drop size created due to the shearing of the high vapor velocity over the polymer film tends to get smaller. This effect has been investigated in the literature, and the relationship between the vapor velocity and liquid drop size is provided in the form of non-dimensional numbers. The Weber number (We) provides the relative effect of inertial forces to surface tension forces, and is given by [1-3]:

$$We = \frac{\rho V^2 d}{\sigma}, \qquad \text{(EQN. 1A)}$$

where $\rho$ is the density of the vapor, V is the average vertical downward vapor velocity, d is the diameter of the molten polymer drop, and the $\sigma$ is the surface tension of the liquid molten polymer drop. The Ohnesorge number, Oh, gives the relative effect of viscous forces to surface tension forces and is given by[1-3]:

$$Oh = \frac{\mu}{\sqrt{\rho_d \sigma_d}}, \quad \text{(EQN. 2A)}$$

where $\mu$ is the dynamic viscosity of the molten polymer drop and $\rho_d$ is the density of the molten polymer drop. A critical Weber number $We_{crit}$ is defined as the Weber number associated with the maximum stable drop size ($d_{max}$) of a liquid, in a given vapor flow: Brodkey (1969) provided an empirical correlation for the variation of the critical Weber number with respect to the Ohnesorge number, and it is given by [2]:

$$We_{crit} = We_{crit}'(1+1.077\ Oh^{1.6}), \quad \text{EQN. 3A}$$

where $We_{crit}'$ is the critical Weber number for a liquid and vapor system with very little viscous effect (Oh<<1), and its value is considered to be approximately 13 [1,2,3]. Using Equations 1A to 3A above, it is possible to predict the maximum stable polymer drop size, $d_{max}$, generated when the high vapor flow shears over the polymer film surface which is flowing over the heater or distributor outer surface.

Figure 5:
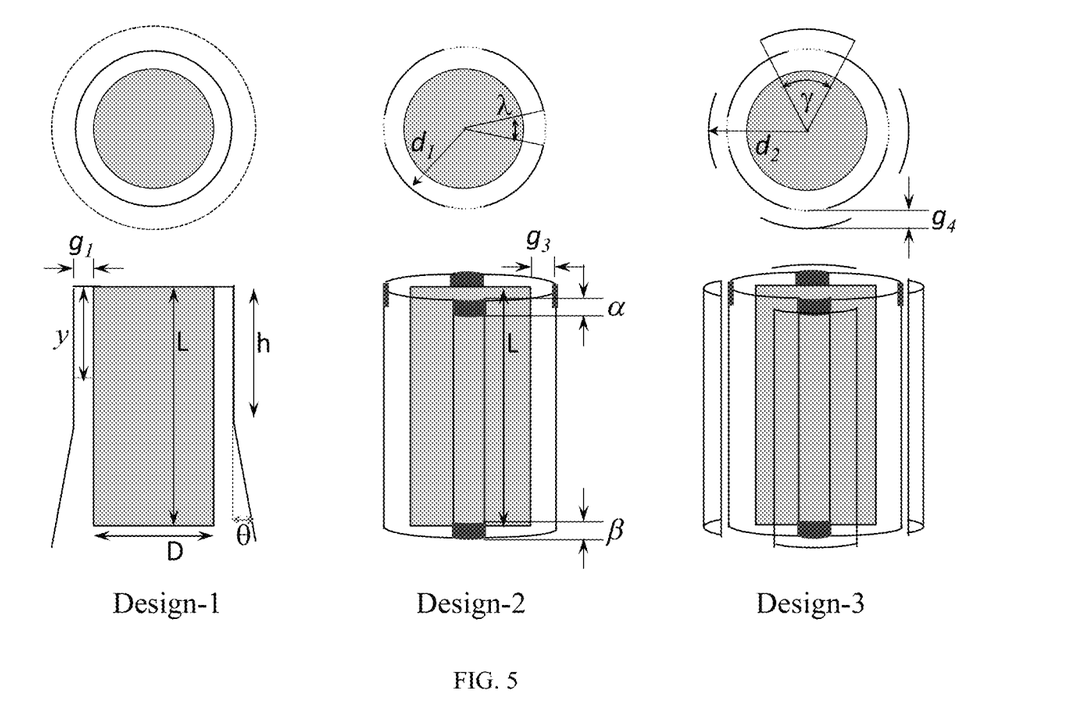
FIG. 5 is a schematic of the details of the shroud designs for the inventive examples shown in FIG. 4.

FIG. 4 shows a comparative "shroud-heater/distributor" design, as well as some inventive "shroud-heater/distributor" designs that have been designed in order to reduce unwanted polymer droplet carryover with the vapor stream. Top and frontal views of the examples are shown. The shaded region depicts the heater or distributor and the outline surrounding it is that of the various configuration of the shroud. FIG. 5 provides more details on the inventive designs shown in FIG. 4.

The comparative example in FIG. 4 has a cylindrical shroud with a constant gap ($g_1$) between the outer surface of the "heater and/or distributor" and the inner surface of the shroud. Here, L is the length of the "heater and/or distributor" and D is its outer diameter. D can range from 20 to 70 inches, preferably from 30 to 60 inches, and L can range from 6 to 240 inches, preferably from 30 to 150 inches. The gap $g_1$ can be 2 to 40 inches, preferably 10 to 30 inches. The length (L) of the shroud can range from 0.8 to 1.5 times the length of the heater or distributor.

Inventive example 1 in FIG. 4 is depicted by Design-1 in FIG. 5. This design can have an initial gap $g_1$, for a certain length $h_1$, as measured from the top of the shroud, and ranging from 0 to length value $h_1$, as shown in FIG. 5. The length $h_1$ can range from 0 to 200 inches, preferably from 6 to 60 inches. At length $h_1$ as measured from the top of the heater or distributor, there begins a conical section, with an angle $\theta$ from the vertical axis, as defined by the initial gap $g_1$ and the length $h_1$ at the top part of the shroud. The angle $\theta$ can range from 5 to 25 degrees, preferably from 10 to 15 degrees. Therefore, the gap, g, between the outer surface of the "heater and/or distributor" and the inner surface of the shroud is variable, and it is defined by EQN. 4A:

$$g \geq \sqrt{\frac{qD y}{V_{vd}} + D^2} - D, \text{ for } h_1 \leq g \leq h_2, \quad \text{EQN. 4A}$$

where D is the diameter of component A, y is the vertical distance from the top of component A to the point along component A where the width of the gap is measured, q is the volumetric flow rate of the evaporated solvent per unit area per unit time, and $V_{vd}$ is the desired maximum downward average velocity in the gap region between component B and component A, defined as the ratio of the total volumetric flow rate of the solvent divided by the annular cross-sectional area between components A and B at that point y. $V_{vd}$ can range in value from 1 to 30 m/s, preferably between 2 to 15 m/s. The design of the shroud is dictated by EQN. 5A and 5B, depending on the value of y:

$$V_{vd} \geq \frac{qDy}{\left(g_1 + \frac{D}{2}\right)^2 - \left(\frac{D}{2}\right)^2}, \text{ if } y \leq h_1, \qquad \text{EQN. 5A}$$

$$V_{vd} \geq \frac{qDy}{\left(g_1 + (y - h_1)\tan\theta + \frac{D}{2}\right)^2 - \left(\frac{D}{2}\right)^2}, \text{ if } h_2 \geq y > h_1. \qquad \text{EQN. 5B}$$

In a variation of inventive example 1, there can be a cylindrical section at the bottom of the conical section. The length of the bottom cylindrical section, $h_3$, can be from 0 to 100 inches long, further from 1 to 50 inches long, and preferably from 2 to 40 inches long. Typically the bottom cylindrical section, $h_3$, can extend beyond the length of component A. For the bottom cylindrical section, EQN. 5C applies:

$$V_{vd} \geq \frac{qDy}{\left(g_2 + \frac{D}{2}\right)^2 - \left(\frac{D}{2}\right)^2}, \text{ if } y > h_2. \qquad \text{EQN. 5C}$$

Inventive examples 2 and 4 in FIG. 4 are variations of Design-2 in FIG. 5. In these cases, the shroud is mostly cylindrical with constant gap $g_3$, where $g_3$ can range from 2 to 40 inches, preferably 12 to 20 inches. There can be a continuous portion of the shroud both near the top and near the bottom of the shroud, as measured from the top. There are n number of openings or slits around the surface of the shroud creating a partial or segmented shroud: each opening can begin at a length a as measured from the top of the shroud, and end at a distance $\beta$ as measured from the bottom of the shroud, where a and B can range from 0 to 60 inches, preferably from 3 to 40 inches. The segment of each opening is such that it forms an angle 2, when observed from the cross view at the top of the design, and $\lambda$ can range from 10 to 45 degrees, preferably from 15 to 30 degrees.

Inventive example 3, in FIG. 4, is described by Design 3 in FIG. 5, and it is a variation of inventive example 2: there is an additional layer of segmented shroud, which is larger in diameter than the segmented shroud in inventive examples 2 and 4. The gap $g_4$ between the outer diameter of the innermost partial shroud and the inner diameter of the outer segmented shroud ranges from 2 to 30 inches. The outer shroud creates segments, such that each segment of the outer shroud is placed to cover the opening from the inner-most partial cylindrical shroud, with each size defined by a segment forming an angle □□ when observed from the top cross-section of the design, where □ can range from 10 to 60 degrees, preferably from 15 to 40 degrees.

The shroud designs in inventive examples 2 to 4 are such so that they satisfy equations 6A to 6C, depending on a location y, as measured from the top of the heater and/or distributor:

$$\text{if } y \leq \alpha \quad V_{vd} \geq \frac{qDy}{\left(g_3 + \frac{D}{2}\right)^2 - \left(\frac{D}{2}\right)^2}, \quad \text{EQN. 6A}$$

$$\text{if } \alpha < y < L - \beta \quad \text{EQN. 6B}$$

$$V_{vd} \geq \frac{qDy}{\frac{n\lambda}{2}(D + 2g_3)(y - \alpha) + \left(g_3 + \frac{D}{2}\right)^2 - \left(\frac{D}{2}\right)^2},$$

$$\text{if } L - \beta \leq y \leq L \quad \text{EQN. 6C}$$

$$V_{vd} \geq \frac{qDy}{\frac{n\lambda}{2}(D + 2g_3)(y - \alpha - \beta) + \left(g_3 + \frac{D}{2}\right)^2 - \left(\frac{D}{2}\right)^2}.$$

In the examples shown in FIGS. 4 and 5, the "heater and/or distributor" has a diameter D of 30 inches and a height L of 65 inches. The "heater and/or distributor" used in this example receives a polymer flow rate of 9.44 m$^3$/hr, and a solvent vapor flow rate of 14130 m$^3$/hr. The polymer flow rate can be determined by production rate in a plant either from measurements of pellet weights or from overall mass balances. The solvent vapor flow rate can be determined by summing up all the vapor streams leaving the flash units and using flow measurements located in various streams.

For the examples shown in FIGS. 4 and 5, the melt polymer density is taken to be 742 kg/m$^3$ and the vapor density is taken to be 0.085 kg/m$^3$. The polymer melt density can be measured using method ASTM D1238. This method typically provides a melt density for polyethylene materials at 190° C. of 0.7634 g/cm$^3$. The solvent vapor density can be estimated using an equation of state at the process conditions, such as PC-SAFT implemented in the AspenTech software program[4], given the vapor stream temperature and pressure. In these examples, the vapor density was estimated at 210° C. and 30 mbar absolute pressure. The viscosity of the molten polymer in these conditions measured at very low shear rate ($1 \cdot 10^{-4}$-$1 \cdot 10^2$ sec$^{-1}$) was estimated to be 750 Pa·s, and the surface tension of the molten polymer was estimated at 0.03 N·m. The average velocity of the vapor exiting the slots of the heater and/or distributor in the radial direction, q, is 5.2 m/s. $V_{vd}$ has been chosen to be 5 m/s.

Details on calculating the radial vapor velocity out of the slots and the maximum downward vapor velocity for each of the comparative and inventive examples presented in FIG. 4 are described below.

REFERENCES

1. Lefebvre. A. H.: Atomization and Sprays. Taylor & Francis. (1989).
2. Brodkey. R. S.: The Phenomena of Fluid Motions. Addison-Wesley. Reading. Mass. (1969)
3. Pilch. M.: Erdman C. A.: Use of break-up time data and velocity history data to predict the maximum size of stable fragments for acceleration-induced break-up of a liquid drop. Int. J. Multiphase Flow. 13(6)741-757 (1987).
4. ASPENTECH Software. Version 8.6. 2017.
5. Rosin. P.: Rammler. E. (1933). "The Laws Governing the Fineness of Powdered Coal". Journal of the Institute of Fuel. 7: 29-36.

Further Review of Velocity Determinations for Different Shroud Designs

Note, the same heater and/or distributor unit (component A) was used in each devo design below. Additionally, the gap width w mentioned earlier would be referred to as either $g_1$ and $g_2$ for Inventive Example 1 (FIG. 6) and $g_3$ for Inventive Examples 2, 3, and 4. The $V_{vd}$ is set equal to the average vapor velocity out of the slots of heater and/or distributor. Outer diameter of component A=30 inches (0.76 meter). Length of component A=65 inches (1.65 meters).

Component A: 2000 slots, area of each slot opening=$3.76 \times 10^{-4}$ m$^2$, total area of all slot openings=0.753 m$^2$. The number of openings in component A multiplied by the cross-sectional area of each opening=0.753 m$^2$.

The total solvent vapor flow rate at the exit of component A, at the temperature and the pressure of the devolatilizer, is based upon the total polymer production rate. Polymer production rate=7000 kg/hr: Solvent (ISOPAR® E) flow rate=1200 kg/hr, temperature of devo=210° C., pressure of devo=30 mBar. The temperature and pressure represent equilibrated temperatures and pressures. Volumetric flow rate of solvent=3.92 m$^3$/sec. Volumetric flow rate of isolated polymer=0.0027 m$^3$/sec.

Density of solvent (kg/m$^3$): generate calibration curve—measure solvent density versus temperature and set pressure, for example ASTM D 1657: determine density at temperature of interest.

Total solvent vapor flow rate at the exit of component A, at the pressure and the temperature of the devolatilizer, =Volumetric flow rate of solvent=(mass flow rate)/(density of solvent) at the pressure and the temperature of the devolatilizer.

Radial average velocity exiting the component A, defined as the ratio of "the total solvent vapor at the temperature and pressure of the devolatilizer" to "the number of openings in component A multiplied by the cross-sectional area of each opening radial average velocity exiting the component A=(3.92 m$^3$/sec)/(0.753 m$^2$)=5.2 m/sec.

Figure 7:
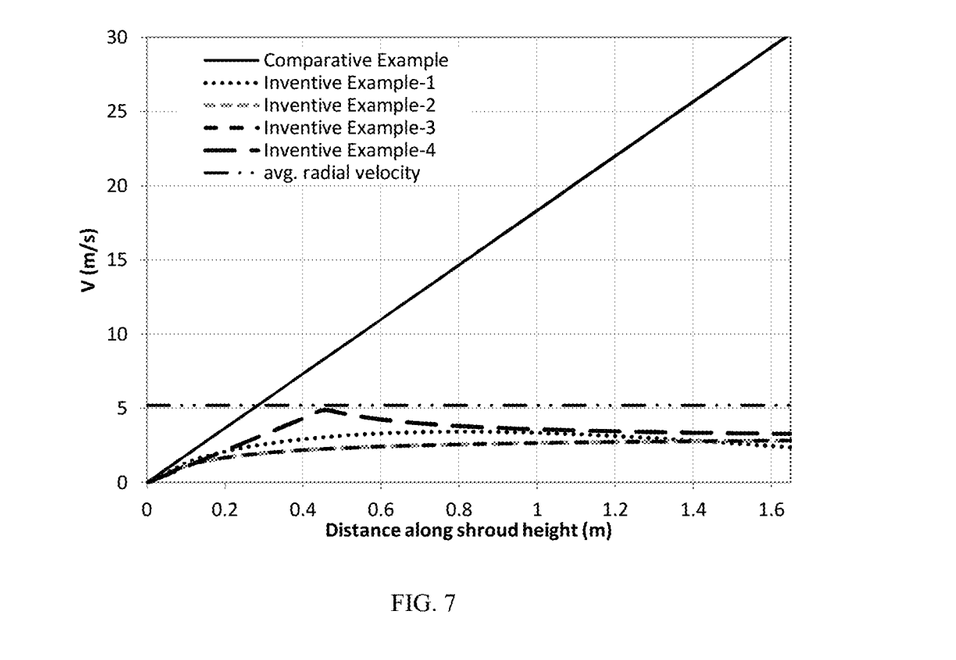
Figure 8:
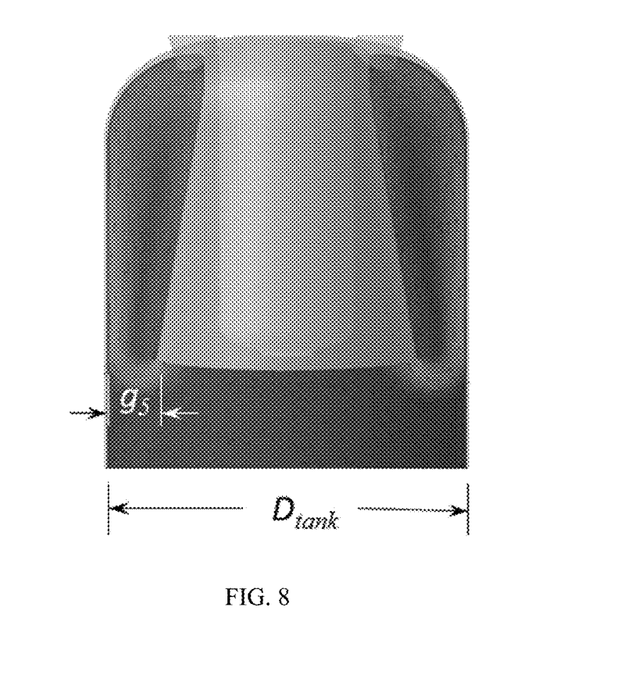

See FIG. 7 for the plot of the "average vertical downward velocity versus y values," for each devo design. FIG. 7 contains a constant line for the radial average velocity exiting the component A. Note, the velocity (V (m/s)) results for Inventive Example 2 and Inventive Example 3 coincide, so they are not distinguishable from each other in FIG. 7.

1) FIG. 4. Inventive Example 1

Component A has a diameter ≥0.76 m, at each distance along the length of component A. The outer vessel has a diameter, $D_{tank}$, of ≥1.8 m.

Within the gap, g, from $g_2 \geq g \geq g_1$, an average vertical downward velocity is defined as the ratio of "the total solvent vapor flow rate," to "the cross-sectional area available for flow," and where each of "the total solvent vapor flow rate" and "the cross sectional area available for flow" is measured at the same vertical distance, y, from the top of the outer surface of component A, and here, the vertical distance, y, from the top of the outer surface of component A, y=0.80 m.

The total solvent vapor flow rate," measured at the same vertical distance, y=0.80 m, from the top of the outer surface of component A:

$$V_{vd} \geq \frac{qD\gamma}{\left(g_1 + \frac{D}{2}\right)^2 - \left(\frac{D}{2}\right)^2}, \text{ if } y \leq h_1, \text{ and} \quad \text{(EQN. 5A)}$$

$$V_{vd} \geq \frac{qD\gamma}{\left(g_1 + (\gamma - h_1)\tan\theta + \frac{D}{2}\right)^2 - \left(\frac{D}{2}\right)^2}, \text{ if } h_2 \geq y > h_1. \quad \text{(EQN. 5B)}$$

q=(volumetric flow rate of solvent)/(unit surface area of component A): surface area of component A, Area, =π D*L; D=outer diameter of component A. The desired average vertical velocity, $V_{vd}$, is set equal to the radial average velocity exiting the component A=(3.92 m³/sec)/(0.753 m²)=5.2 m/sec. Here, D=0.762 m. Here, L=length of component A. Here, L=1.65 m. Area=3.95 m². Volumetric flow rate of solvent=3.92 m³/sec. q=(3.92 m³/sec)/(3.95 m²)=0.99 m/sec. $h_1$=the continuous length of the component B, measured from the top surface of component B, and which length does not deviate from a vertical axis along such length. Here, $h_1$=0. Here, $h_2$=L and $h_3$=0. The $g_1$=the smallest distance from the outer surface of component A to the inner surface of component B, and which distance is located at the weld line of component B. Here, $g_1$=0.0504 m. The θ=is the angle of deviation from the continuous length of the component B, measured from the top surface of component B, and which length does not deviate from a vertical axis along the such length; and wherein θ is measured from the vertical axis away from component A. θ=10 degrees.

The total amount of the solvent vapor that flows downward from at a given vertical distance, y, from the top of the outer surface of component A (total downward solvent vapor at distance y) has the following velocities: a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

The average vertical downward velocity=the total solvent vapor flow rate," to "the cross-sectional area available for flow.

"The total solvent vapor flow rate," to "the cross-sectional area available for flow,"=

$$\frac{qD\gamma}{\left(g_1 + (\gamma - h_1)\tan\theta + \frac{D}{2}\right)^2 - \left(\frac{D}{2}\right)^2} = 3.44 \text{ m/sec.}$$

The average vertical downward velocity≤the radial average velocity exiting the component A. 3.44 m/sec≤5.2 m/sec, for y=0.80 m.

2) FIG. 4. Inventive Example 2

Component A has a diameter ≥0.76 m at each distance along the length of component A. The outer vessel has a diameter, $D_{tank}$, of ≥1.0 m.

Within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

Vertical distance, y, from the top of the outer surface of component A, y=0.80 m.
The total solvent vapor flow rate," is measured at the same vertical distance, y=0.80 m, from the top of the outer surface of component A.

$$\text{if } y \leq \alpha \quad V_{vd} \geq \frac{qDy}{\left(g_3 + \frac{D}{2}\right)^2 - \left(\frac{D}{2}\right)^2}, \quad \text{EQN. 6A}$$

if $\alpha < y < L - \beta$ \quad EQN. 6B $$V_{vd} \geq \frac{qDy}{\frac{n\lambda}{2}(D+2g_3)(y-\alpha) + \left(g_3 + \frac{D}{2}\right)^2 - \left(\frac{D}{2}\right)^2},$$

if $L - \beta \leq y \leq L$ \quad EQN. 6C $$V_{vd} \geq \frac{qDy}{\frac{n\lambda}{2}(D+2g_3)(y-\alpha-\beta) + \left(g_3 + \frac{D}{2}\right)^2 - \left(\frac{D}{2}\right)^2}.$$

The desired average vertical velocity, $V_{vd}$, is set equal to the radial average velocity exiting the component A=(3.92 m³/sec)/(0.753 m²)=5.2 m/sec. q=(volumetric flow rate of solvent)/(unit surface area of component A). Surface area of component A, Area=π D*L. D=outer diameter of component A. Here, D=0.762 m. Here, L=length of component A.
Here, L=1.65 m. Area=3.95 m². Volumetric flow rate of solvent=3.92 m³/sec. q=(3.92 m³/sec)/(3.95 m²)=0.99 m/sec.
α is the continuous length of the continuous radial section of component B, as measured from the top of component B. Here α=0.
β is the continuous length of the continuous radial section of component B, as measured from the bottom of component B. Here β=0.
n is the number of slits (discontinuous sections) along radial axis of component B, and where each slit has the same width in the radial direction. Here, n=4.
λ is the angle formed by two vectors originating from the center of component A, and in the same plane, and terminating at each respective edge of the width of a slit of component B; and where the plane is perpendicular to the vertical axis of component A. Here, λ=4 degrees.
$g_3$=the radial distance from the outer surface of component A to the inner surface of component B. Here, $g_3$=2 inches=the total solvent vapor flow rate downward from at a given vertical distance, y, from the top of the outer surface of component A (total downward solvent vapor flow rate at distance y) has the following velocities: a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

"The total solvent vapor flow rate," to "the cross-sectional area available for flow=

$$\frac{qD\gamma}{\frac{n\lambda}{2}(D+2g_3)(y-\alpha) + \left(g_3 + \frac{D}{2}\right)^2 - \left(\frac{D}{2}\right)^2} = 2.59 \text{ m/s}$$

The average vertical downward velocity is less than, or equal to, the radial average velocity exiting the component A. 2.59 m/sec≤5.2 m/sec, for y=0.80 m.

3) FIG. 4. Inventive Example 3

Component A has a diameter ≥0.76 m at each distance along the length of component A. The outer vessel has a diameter, $D_{tank}$, of ≥1.5 m.

Within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

Vertical distance, y, from the top of the outer surface of component A, y=0.80 m.
The total solvent vapor flow rate," as measured at the same vertical distance, y=0.80 m, from the top of the outer surface of component A.

$$\text{if } y \le \alpha \quad V_{vd} \ge \frac{qDy}{\left(g_3 + \frac{D}{2}\right)^2 - \left(\frac{D}{2}\right)^2}, \quad \text{EQN. 6A}$$

$$\text{if } \alpha < y < L - \beta \quad \text{EQN. 6B}$$

$$V_{vd} \ge \frac{qDy}{\frac{n\lambda}{2}(D + 2g_3)(y - \alpha) + \left(g_3 + \frac{D}{2}\right)^2 - \left(\frac{D}{2}\right)^2},$$

$$\text{if } L - \beta \le y \le L \quad \text{EQN. 6C}$$

$$V_{vd} \ge \frac{qDy}{\frac{n\lambda}{2}(D + 2g_3)(y - \alpha - \beta) + \left(g_3 + \frac{D}{2}\right)^2 - \left(\frac{D}{2}\right)^2},$$

$V_{vd}$ is set equal to the radial average velocity exiting the component A=(3.92 m³/sec)/(0.753 m²)=5.2 m/sec.
q=(volumetric flow rate of solvent)/(unit surface area of component A).
Surface area of component A, Area=π D*L.
D=outer diameter of component A. Here, D=0.762 m.
L=length of component A. Here, L=1.65 m, and Area=3.95 m².
Volumetric flow rate of solvent=3.92 m³/sec.
q=(3.92 m³/sec)/(3.95 m²)=0.99 m/sec.
α is the continuous length of the continuous cylindrical section of component B, as measured from the top of component B. Here α=0.
β is the continuous length of the continuous cylindrical section of component B, as measured from the bottom of component B. Here β=0.
n is the number of slits (discontinuous sections) along radial axis of component B, and where each slit has the same width in the radial direction. Here, n=4.
λ is the angle formed by two vectors originating from the center of component A, and in the same plane, and terminating at each respective edge of the width of a slit of component B; and where the plane is perpendicular to the vertical axis of component A. Here, λ=4 degrees
γ is the angle formed by two vectors originating from the center of component A and in the same plane perpendicular to the vertical axis of component A, and terminating at each respective edge of the cover sheet placed at a gap $g_3$ from component B.

γ=6 degrees..
$g_3$=the radial distance from the outer surface of component A to the inner surface of component B.
$g_4$=the radial distance from the outer surface of component B to the inner surface of a cover sheet placed in such a way that it blocks the slits in component B.
Here, $g_3$=2 inches and $g_4$=3 inches.

The total solvent vapor flow rate downward from at a given vertical distance, y, from the top of the outer surface of component A (total downward solvent vapor flow rate at distance y) has the following velocities: a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

"The total solvent vapor flow rate," to "the cross-sectional area available for flow=

$$\frac{qD\gamma}{\frac{n\lambda}{2}(D + 2g_3)(\gamma - \alpha) + \left(g_3 + \frac{D}{2}\right)^2 - \left(\frac{D}{2}\right)^2} = 2.59 \text{ m/s}$$

The average vertical downward velocity≤ the radial average velocity exiting the component A. 2.59 m/sec≤5.2 m/sec, for y=0.80 m.

4) FIG. 4. Inventive Example 4

Component A has a diameter ≥0.76 m at each distance along the length of component A. The outer vessel has a diameter, $D_{tank}$, of ≥1.2 m.

Within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A, and the vertical distance, y, from the top of the outer surface of component A, y=0.80 m.

The total solvent vapor flow rate," measured at the same vertical distance, y=0.80 m, from the top of the outer surface of component A.

$$\text{if } y \le \alpha \quad V_{vd} \ge \frac{qDy}{\left(g_3 + \frac{D}{2}\right)^2 - \left(\frac{D}{2}\right)^2}, \quad \text{EQN. 6A}$$

$$\text{if } \alpha < y < L - \beta \quad \text{EQN. 6B}$$

$$V_{vd} \ge \frac{qDy}{\frac{n\lambda}{2}(D + 2g_3)(y - \alpha) + \left(g_3 + \frac{D}{2}\right)^2 - \left(\frac{D}{2}\right)^2},$$

$$\text{if } L - \beta \le y \le L \quad \text{EQN. 6C}$$

$$V_{vd} \ge \frac{qDy}{\frac{n\lambda}{2}(D + 2g_3)(y - \alpha - \beta) + \left(g_3 + \frac{D}{2}\right)^2 - \left(\frac{D}{2}\right)^2}.$$

$V_{vd}$ is set equal to the radial average velocity exiting the component A=(3.92 m³/sec)/(0.753 m²)=5.2 m/sec.
q=(volumetric flow rate of solvent)/(unit surface area of component A).

Surface area of component A, Area=π D*L.
D=outer diameter of component A. Here, D=0.762 m.
Here, L=length of component A. Here, L=1.65 m.
Area=3.95 m².
Volumetric flow rate of solvent=3.92 m³/sec.
q=(3.92 m³/sec)/(3.95 m²)=0.99 m/sec.
α is the continuous length of the continuous radial section of component B, as measured from the top of component B. Here α=18 inch=0.457 m.
β is the continuous length of the continuous radial section of component B, as measured from the bottom of component B. Here β=0.
n is the number of slits (discontinuous sections) along radial axis of component B, and where each slit has the same width in the radial direction. Here, n=4.
λ is the angle formed by two vectors originating from the center of component A, and in the same plane, and terminating at each respective edge of the width of a slit of component B: and where the plane is perpendicular to the vertical axis of component A. Here, λ=4 degrees.
$g_3$=the radial distance from the outer surface of component A to the inner surface of component B. Here, $g_3$=3.25 inches=0.0825 m.

The total solvent vapor flow rate downward from at a given vertical distance, y, from the top of the outer surface of component A (total downward solvent vapor flow rate at distance y) has the following velocities: a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

"The total solvent vapor flow rate," to "the cross-sectional area available for flow"=

$$V_{vd} \geq \frac{qD\gamma}{\frac{n\lambda}{2}(D+2g_3)(\gamma-\alpha)+\left(g_3+\frac{D}{2}\right)^2-\left(\frac{D}{2}\right)^2} = 3.80 \text{ m/s}$$

The average vertical downward velocity≤ the radial average velocity exiting the component A. 3.80 m/sec<5.2 m/sec, for y=0.80 m.

5) FIG. 4. Comparative Example

Component A has a diameter ≥0.76 m, at each distance along the length of component A. The outer vessel has a diameter, $D_{tank}$, of ≥1.0 m.
a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

The vertical distance, y, from the top of the outer surface of component A, y=0.80 m.

The total solvent vapor flow rate," measured at the same vertical distance, y=0.80 m, from the top of the outer surface of component A.

if $y \leq \alpha$ $V_{vd} \geq \frac{qDy}{\left(g_3+\frac{D}{2}\right)^2-\left(\frac{D}{2}\right)^2}$, EQN. 6A -continued if $\alpha < y < L - \beta$ EQN. 6B $$V_{vd} \geq \frac{qDy}{\frac{n\lambda}{2}(D+2g_3)(y-\alpha)+\left(g_3+\frac{D}{2}\right)^2-\left(\frac{D}{2}\right)^2},$$

if $L - \beta \leq y \leq L$ EQN. 6C $$V_{vd} \geq \frac{qDy}{\frac{n\lambda}{2}(D+2g_3)(y-\alpha-\beta)+\left(g_3+\frac{D}{2}\right)^2-\left(\frac{D}{2}\right)^2}.$$

$V_{vd}$ is set equal to the radial average velocity exiting the component A=(3.92 m³/sec)/(0.753 m²)=5.2 m/sec.
q=(volumetric flow rate of solvent)/(unit surface area of component A).
Surface area of component A, Area=π D*L.
D=outer diameter of component A. Here, D=0.762 m.
L=length of component A. Here, L=1.65 m. Area=3.95 m².
Volumetric flow rate of solvent=3.92 m³/sec.
q=(3.92 m³/sec)/(3.95 m²)=0.99 m/sec.
$g_3$=the radial distance from the outer surface of component A to the inner surface of component B. Here, $g_3$=2 inches=0.051 m.

The total solvent vapor flow rate downward from at a given vertical distance, y, from the top of the outer surface of component A (total downward solvent vapor flow rate at distance y) has the following velocities; a) within the gap, an average vertical downward velocity, defined as the ratio of "the total solvent vapor flow rate," to "the cross-sectional area available for flow," and wherein each of "the total solvent vapor flow rate" and "the cross sectional area available for flow" is measured at the same vertical distance, y, from the top of the outer surface of component A.

"The total solvent vapor flow rate," to "the cross-sectional area available for flow=

$$\frac{qD\gamma}{\left(g_3+\frac{D}{2}\right)^2-\left(\frac{D}{2}\right)^2} = 14.8 \text{ m/s}.$$

The average vertical downward velocity≥the radial average velocity exiting the component A. 14.8 m/sec>5.2 m/sec, for y=0.80 m.

The invention claimed is:

1. A devolatilizer (devo), which operates at a temperature (T) and at a pressure (P), for the separation of at least a portion of a solvent from a polymer-rich solution comprising the solvent and a polymer, and wherein the devolatilizer comprises at least the following components:
A) a distributor, a heater, or a heater/distributor combination (component A) of length L, the vertical distance from the top to the bottom of the component A;
B) a shroud (component B) located around some or all of the periphery of component A; and wherein the shroud comprises at least one cylindrical section situated outside the periphery of component A, and wherein this cylindrical section encloses at least a portion of the periphery of component A, and
C) a gap (component C) located between the outer surface of component A and the inner surface of component B, and wherein the gap has a width (w), the distance from the outer surface of component A to the inner surface of the at least one cylindrical section of component B, and the gap has a length ≤L; and wherein w is downwardly widened continuously along the length L; and wherein component A comprises an inner channel, and a plurality of cross-sectional openings extending from the inner channel to the gap; and wherein some or all of the polymer rich solution enters the inner channel, and moves radially through the cross-sectional openings, and within each opening, some or all of the solvent of the polymer rich solution is vaporized, forming a solvent vapor and a polymer melt; and wherein the polymer melt enters the gap, and flows downward from the point of entrance into the gap, and wherein some or all of the solvent vapor flows downward from the point of entrance into the gap; and wherein for each vertical distance, y, as measured from the top of the outer surface of component A, the total amount of the solvent vapor that leaves component A at the given distance y, and flows downward into component C, has the following velocities:

a) within the gap, an average vertical downward velocity, defined as the ratio of "the total solvent vapor flow rate" to "the cross-sectional area available for flow," and wherein each of "the total solvent vapor flow rate" and "the cross sectional area available for flow" is measured at the same vertical distance, y, and b) a radial average velocity exiting the component A, defined as the ratio of "the total solvent vapor flow rate at the exit of component A, at the temperature (T) and pressure (P) of the devolatilizer" to "the number of openings in component A multiplied by the cross-sectional area of each opening;" and wherein the average vertical downward velocity≤the radial average velocity exiting the component A.

2. The devolatilizer of claim 1, wherein the width (w) of the gap varies along the length L.

3. The devolatilizer of claim 1, wherein, for each distance y, the average vertical downward velocity ranges from 1.0 m/s to 10.0 m/s.

4. The devolatilizer of claim 1, wherein component A is cylindrical in shape.

5. The devolatilizer of claim 1, wherein, for component A, the cross-sectional openings all have the same dimensions.

6. The devolatilizer of claim 1, wherein, for component B, the cylindrical section has a length which is greater than, or equal to, the length of component A.

7. The devolatilizer of claim 1, wherein, for component B, the cylindrical section has a length which is less than the length of component A.

8. The devolatilizer of claim 1, wherein, for component B, the cylindrical section comprises a cylindrical flared cylinder, which has a diameter, at the end of the flared cylinder, that is greater than the diameter, at the beginning of the flared cylinder.

9. The devolatilizer of claim 8, wherein the diameter at the end of the flared section is greater than 1.2× the diameter at the beginning of the flared section.

10. The devolatilizer of claim 1, wherein, for component B, the cylindrical section comprises a vertical section of length $h_1$, followed by a flared section of length $h_2$.

11. The devolatilizer of claim 10, wherein the flared section of length $h_2$ is followed by a vertical section of length $h_3$.

12. The devolatilizer of claim 1, wherein the shroud of component B comprises ≥2 separate sections, and each section is located at a distance $d_1$ from the center of component A.

13. The devolatilizer of claim 12, wherein the shroud of component B comprises ≥4 separate sections, and each section is located at a distance $d_1$ from the center of component A.

14. The devolatilizer of claim 12, wherein the shroud of component B comprises at least 8 separate sections, and wherein at least 4 of the sections are located at a distance $d_1$ from the center of component A, and at least 4 of the sections are located at a distance de from the center of component A; and wherein $d_2 > d_1$.

15. The devolatilizer of claim 14, wherein $d_2 > 1.2 \times d_1$.

16. The devolatilizer of claim 1, wherein the cylindrical section of component B comprises an upper continuous radial section of length $L_C$, and a lower segmented section comprising ≥2 separate segments, each of length $L_S$; and wherein $L_S \geq L_C$; and wherein $L_C$ is measured from the top of component B to the end of the upper continuous radial section; and wherein $L_S$ is measured from the top of component B to the end of a lower segmented section.

17. The devolatilizer of claim 16, wherein lower segmented section comprises ≥4 separate segments, each of length $L_S$; and wherein $L_S \geq L_C$.

18. The devolatilizer of claim 16, wherein $L_S > 1.2 \times L_C$.

19. The devolatilizer of claim 1, wherein the devolatilizer operates at a temperature (T) from 100° ° C. to 300° C., and at a pressure (P) from 3 mBar to 100 mBar.

20. The devolatilizer of claim 1, wherein the devolatilizer further comprises an outer vessel, and wherein there is a gap ($g_5$) located between the outer surface of the cylindrical section of component B and the inner surface of the outer vessel.

21. The devolatilizer of claim 20, wherein the width of $g_5$ varies continuously or discontinuously along the cylindrical section of component B.

22. The devolatilizer of claim 20, wherein the ratio of "the minimum width of $g_5$" to "the maximum width of the gap of component C" is ≥0.5.

23. A reactor system comprising at least one reactor and the devolatilizer of claim 1.

24. The reactor system of claim 23, wherein the at least one reactor is a loop reactor.

25. A solution polymerization process to form a polymer, said process comprising at least the following steps:
  i) reacting a mixture comprising a solvent, monomer, and optionally one or more comonomers, in at least one reactor, to form a polymer solution comprising the solvent and the polymer;
  ii) separating at least a portion of the solvent from the polymer solution to form a polymer-rich solution comprising the polymer and solvent, and wherein the polymer-rich solution comprises more polymer than the polymer solution;
  ii) separating at least a portion of the solvent from the polymer-rich solution using the devolatilizer of claim 1.

26. The process of claim 25, wherein the polymer is an olefin-based polymer.

* * * * *